(12) United States Patent
Maurer et al.

(10) Patent No.: US 8,903,174 B2
(45) Date of Patent: Dec. 2, 2014

(54) SERIAL TEXT DISPLAY FOR OPTIMAL RECOGNITION APPARATUS AND METHOD

(75) Inventors: Maik Steffen Maurer, Ismaning (DE); Matthias Klein, Otterfing (DE); Francis Abbott Waldman, Stoneham, MA (US)

(73) Assignee: Spritz Technology, Inc., Storeham, MA (US)

( * ) Notice: Subject to any disclaimer, the term of this patent is extended or adjusted under 35 U.S.C. 154(b) by 362 days.

(21) Appl. No.: 13/547,982

(22) Filed: Jul. 12, 2012

(65) Prior Publication Data
US 2014/0016867 A1    Jan. 16, 2014

(51) Int. Cl.
*G06K 9/00*    (2006.01)

(52) U.S. Cl.
USPC ............................ 382/189; 345/467; 715/273

(58) Field of Classification Search
USPC .......... 382/182, 184, 189; 345/467, 471, 679; 715/209, 273, 719, 808, 835
See application file for complete search history.

(56) References Cited

U.S. PATENT DOCUMENTS

| | | | |
|---|---|---|---|
| 4,845,645 A | 7/1989 | Matin et al. | |
| 4,932,416 A | 6/1990 | Rosenfeld | |
| 5,137,027 A | 8/1992 | Rosenfeld | |
| 5,873,109 A | 2/1999 | High | |
| 6,067,069 A | 5/2000 | Krause | |
| 6,098,085 A | 8/2000 | Blonder et al. | |
| 6,113,394 A | 9/2000 | Edgar | |
| 6,130,968 A | 10/2000 | McIan et al. | |
| 6,292,176 B1 | 9/2001 | Reber et al. | |
| 6,353,824 B1 | 3/2002 | Boguraev et al. | |
| 6,515,690 B1 | 2/2003 | Back et al. | |
| 6,553,373 B2 | 4/2003 | Boguraev et al. | |
| 6,568,939 B1 | 5/2003 | Edgar | |
| 6,652,283 B1 | 11/2003 | Van Schaack et al. | |
| 6,686,928 B1 | 2/2004 | Reber et al. | |
| 6,816,174 B2 | 11/2004 | Tiongson et al. | |
| 6,865,572 B2 | 3/2005 | Boguraev et al. | |
| 6,925,613 B2 | 8/2005 | Gibson | |
| 7,139,006 B2 | 11/2006 | Wittenburg et al. | |
| 7,159,172 B1 | 1/2007 | Bentley et al. | |
| 7,173,621 B2 | 2/2007 | Reber et al. | |
| 7,272,787 B2 | 9/2007 | Nakamura et al. | |
| 7,365,741 B2 | 4/2008 | Chincholle et al. | |
| 7,404,142 B1 | 7/2008 | Tischer | |

(Continued)

FOREIGN PATENT DOCUMENTS

| | | |
|---|---|---|
| CN | 1461435 A | 12/2003 |
| EP | 2323357 A1 | 5/2011 |

(Continued)

OTHER PUBLICATIONS

U.S. Appl. No. 13/730,163, filed Dec. 28, 2012, Waldman et al.

(Continued)

*Primary Examiner* — Samir Ahmed
(74) *Attorney, Agent, or Firm* — Mauriel Kapouytian Woods LLP; Michael Mauriel

(57) ABSTRACT

Various embodiments are disclosed that relate to serially displaying text on an electronic display using techniques for placement of an optimal recognition position of words at a fixed display location. In some embodiments, an optimal recognition position character is displayed at the fixed display location. In other embodiments, an optimal recognition proportionate position is displayed at the fixed display location. Various related techniques for processing and displaying text are further disclosed herein.

62 Claims, 9 Drawing Sheets

(56) References Cited

U.S. PATENT DOCUMENTS

| | | | |
|---|---|---|---|
| 7,454,717 | B2 | 11/2008 | Hinckley et al. |
| 7,475,334 | B1 | 1/2009 | Kermani |
| 7,478,322 | B2 | 1/2009 | Konttinen |
| 7,549,114 | B2 | 6/2009 | Bederson et al. |
| 7,598,977 | B2 | 10/2009 | Ryall et al. |
| 7,613,731 | B1 | 11/2009 | Larson |
| 7,627,590 | B2 | 12/2009 | Boguraev et al. |
| 7,647,345 | B2 | 1/2010 | Trepess et al. |
| 7,710,411 | B2 | 5/2010 | Reber et al. |
| 7,730,397 | B2 | 6/2010 | Tischer |
| 7,783,978 | B1 | 8/2010 | Andrews et al. |
| 7,835,581 | B2 | 11/2010 | Mathan et al. |
| 7,946,707 | B1 | 5/2011 | McDonald, II et al. |
| 7,991,195 | B2 | 8/2011 | Mathan et al. |
| 7,991,920 | B2 | 8/2011 | Back et al. |
| 8,059,136 | B2 | 11/2011 | Mathan |
| 8,069,466 | B2 | 11/2011 | Shelton et al. |
| 8,165,407 | B1 | 4/2012 | Khosla et al. |
| 8,214,309 | B1 | 7/2012 | Khosla et al. |
| 8,244,475 | B2 | 8/2012 | Aguilar et al. |
| 8,245,142 | B2 | 8/2012 | Mizrachi et al. |
| 8,249,397 | B2 | 8/2012 | Wood et al. |
| 8,265,743 | B2 | 9/2012 | Aguilar et al. |
| 8,274,592 | B2 | 9/2012 | Watkins et al. |
| 8,285,052 | B1 | 10/2012 | Bhattacharyya et al. |
| 8,292,433 | B2 | 10/2012 | Vertegaal |
| 8,307,282 | B2 | 11/2012 | Saito et al. |
| 8,335,751 | B1 | 12/2012 | Daily et al. |
| 8,363,939 | B1 | 1/2013 | Khosla et al. |
| 8,369,652 | B1 | 2/2013 | Khosla et al. |
| 8,374,687 | B2 | 2/2013 | Mathan et al. |
| 8,418,057 | B2 | 4/2013 | Knight et al. |
| 8,458,152 | B2 | 6/2013 | Fogg et al. |
| 8,472,791 | B2 | 6/2013 | Gargi |
| 8,483,816 | B1 | 7/2013 | Payton et al. |
| 8,699,767 | B1 * | 4/2014 | Khosla et al. ............... 382/128 |
| 2002/0133521 | A1 * | 9/2002 | Campbell et al. ............ 707/526 |
| 2003/0038754 | A1 | 2/2003 | Goldstein et al. |
| 2003/0184560 | A1 | 10/2003 | Pierce |
| 2004/0107195 | A1 | 6/2004 | Trepess |
| 2004/0119684 | A1 * | 6/2004 | Back et al. .................. 345/156 |
| 2006/0100984 | A1 * | 5/2006 | Fogg et al. .................... 707/1 |
| 2007/0061720 | A1 * | 3/2007 | Kriger .......................... 715/700 |
| 2008/0141126 | A1 | 6/2008 | Johnson et al. |
| 2009/0066722 | A1 * | 3/2009 | Kriger et al. ................ 345/619 |
| 2009/0083621 | A1 | 3/2009 | Kermani |
| 2010/0280403 | A1 | 11/2010 | Erdogmus et al. |
| 2011/0117969 | A1 | 5/2011 | Hanson |
| 2013/0100139 | A1 | 4/2013 | Schliesser et al. |
| 2013/0159850 | A1 | 6/2013 | Cohn |
| 2013/0222378 | A1 | 8/2013 | Koivusalo |

FOREIGN PATENT DOCUMENTS

| | | |
|---|---|---|
| KR | 2002-0011933 A | 2/2002 |
| WO | WO 98/41937 A1 | 9/1998 |
| WO | WO 02/37256 A2 | 5/2002 |
| WO | WO-2008/051510 A2 | 5/2008 |

OTHER PUBLICATIONS

Brysbaert, "Interhemispheric transfer and the processing of foveally presented stimuli," Behavioural Brain Research, 1994, pp. 151-161, vol. 64.

Brysbaert et al., "Visual Constraints in Written Word Recognition: Evidence From the Optimal Viewing Position Effect," Journal of Research in Reading, 2005, pp. 216-228, vol. 28, Issue 3.

Brysbaert et al., "Word skipping: Implications for theories of eye movement control in reading," Eye Guidance in Reading and Scene Perception, 1998, pp. 125-147, Chapter 6.

Clark et al., "Word Ambiguity and the Optimal Viewing Position in Reading," Preprint submitted to Elsevier Preprint, 1998, pp. 1-50.

Engbert et al., "SWIFT: A Dynamical Model of Saccade Generation during Reading," Psychological Review, 2005, pp. 777-813, vol. 112, No. 4.

Findlay et al., "Saccade target selection in visual search: the effect of information from the previous fixation," Vision Research, 2001, pp. 87-95, vol. 41.

Kliegl et al., "Tracking the Mind During Reading: The Influence of Past, Present, and Future Words on Fixation Durations," J. of Exp. Psyc., 2006, pp. 12-35, vol. 135, No. 1.

McConkie et al., "Eye Movement Control During Reading:II. Frequency of Refixating a Word," Center for the Study of Reading, 1989, pp. 1-30, Technical Report No. 469.

Nazir et al., "Letter visibility and word recognition: The optimal viewing position in printed words," Perception & Psychophysics, 1992, pp. 315-328, vol. 52, No. 3.

O'Regan et al., "Convenient Fixation Location Within Isolated Words of Different Length and Structure," Journal of Experimental Psychology, 1984, pp. 250-257, vol. 10, No. 2.

Rayner et al., "Asymmetry of the effective visual field in reading," Perception & Psychophysics, 1980, pp. 537-544, vol. 27, No. 6.

Rayner, "Eye Movements in Reading and Information Processing: 20 Years of Research," Psychological Bulletin, 1998, pp. 372-422, vol. 124, No. 3.

Schoonbaert et al., "Letter position coding in printed word perception: Effects of repeated and transposed letters," Language and Cognitive Processes, 2004, pp. 333-367, vol. 19, No. 3.

Staub et al., "Eye movements and on-line comprehension processes," The Oxford handbook of psycholinguistics, 2007, pp. 327-342, Chapter 19.

Stevens et al., "Letter visibility and the viewing position effect in visual word recognition," Perception & Psychophysics, 2003, pp. 133-151, vol. 65, No. 1.

Vitu et al., "Optimal landing position in reading isolated words and continuous text," Perception & Psychophysics, 1990, pp. 583-600, vol. 47, No. 6.

Vitu, "The influence of parafoveal preprocessing and linguistic context on the optimal landing position effect," Perception & Psychophysics, 1991, pp. 58-75, vol. 50.

International Search Report and Written Opinion issued in corresponding International Application No. PCT/US2013/050081 dated Oct. 31, 2013.

* cited by examiner

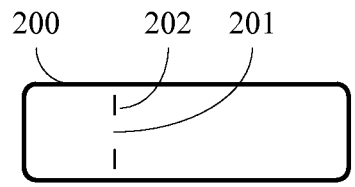
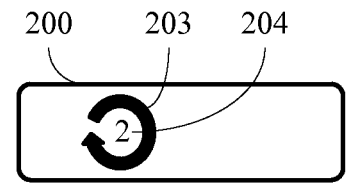
Figure 2a  Figure 2b
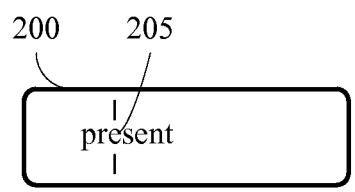
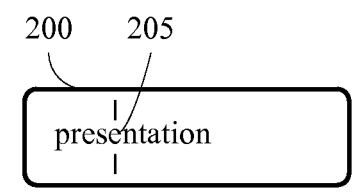
Figure 2c  Figure 2d
FIG. 2

SERIAL TEXT DISPLAY FOR OPTIMAL RECOGNITION APPARATUS AND METHOD

TECHNICAL FIELD AND BACKGROUND OF THE INVENTION

The present invention relates to apparatuses and methods for enabling improved reading in an electronic display.

Despite heavy technological (digital) advances, the illustration of textual information has not fundamentally changed. Texts are typically displayed in lines such that the reader's eye moves sequentially from word to word. With each eye movement ("saccade") time is spent refixating the eye on the new word in order to recognize and process its meaning. The fixation takes about 240 milliseconds ("ms") per word on average. Only 20% of the time for fixation is used for processing the content. It is also very common that a saccade does not reach the correct fixation point, so additional eye movement is required for reading a word.

One display technique for reducing saccades is Rapid Serial Visual Presentation, hereinafter referred to as "RSVP." RSVP was first introduced in the 1970s as a technique for presenting text one word at a time in a display. Many references since then have provided information on the use of RSVP in a variety of applications. Commercially available products based on RSVP include "Zap Reader" (www.zapreader.com/reader) and "Spreeder" (www.spreeder.com). Some prior methods exist for improving the effectiveness of an RSVP by varying the display time of a word in the display based on word length and word type (see, U.S. Pat. No. 6,130,968 to McIan et al. ("McIan")) and based on word frequency (see WO/37256 by Goldstein et al. ("Goldstein 2002")). While these techniques are beneficial in improving comprehension of the displayed text, none of these teach how to minimize saccade movement during the presentation of a word or words in the RSVP display.

SUMMARY OF THE INVENTION

RSVP reduces saccades but does not eliminate them. In previous references on RSVP, each word (or multiple words in some implementations) is centered in the display. Previous research on word recognition, however, has demonstrated that the eye tends to fixate on characters that are to the left of the center. O'Regan conducted experiments on the fixation point in words ranging in length up to 11 characters, clearly showing that word recognition (naming acuity) depends strongly on the position in the word where the eye is fixating at the moment the word appears. (See "Convenient Fixation Location Within Isolated Words of Different Length and Structure" J. K. O'Regan et al. in Journal of Experimental Psychology 1984 Vol. 10, No. 2, 250-257) ("O'Regan"). Brysbaert and Nazir ("VISUAL CONSTRAINTS IN WRITTEN WORD RECOGNITION: EVIDENCE FROM THE OPTIMAL VIEWING POSITION EFFECT," paper by Marc Brysbaert, Royal Holloway, University of London and Tatjana Nazir, Université Lyon 1, contact address: Marc Brysbaert Royal Holloway, University of London, Department of Psychology Egham TW20 OEX, United Kingdom, marc.brysbaert@rhul.ac.uk) ("Brysbaert and Nazir") determined that there is an optimal viewing position for maximum reading speed and empirically determined this viewing position for words of 3, 5, 7, and 9 characters in length. However, not only was this research never applied to RSVP, it provides insufficient information for a practical RSVP application. Therefore, embodiments of the present invention rely on the inventors having established the ORP character positions for words of 4, 6, 8, and 10-13 characters in length.

Words longer than three characters have an optimal fixation position to the left of the middle character for which the time required for word recognition is the shortest. For each letter of deviation from this optimal position, about 20 milliseconds ("ms") are added to lexical decision time or naming latency. Rayner conducted similar research that demonstrated that it is possible to get information about a word from up to 4 characters from the left side of the fixation position and up to 15 characters to the right side, resulting in a perceptual span of 20 characters. (See Keith Rayner et al., "Asymmetry of the effective visual field in reading," in Perception and Psychophysics, 1980, 27(6), 537-534) ("Rayner 1980"). Hyrskytar (see Hyrskykari, Aulikki, "Eyes in Attentive Interfaces: Experiences from Creating iDict, a Gaze-Aware Reading Aid", Academic Dissertation, Department of Computer Sciences, University of Tampere, in Dissertations in Interactive Technology, Number 4, Tampere 2006, pg 49) and Danhaene (see Dehaene, Stanislas, "Les Neurones de la Lecture", Editions Odile Jacob, France, September 2007) have also taught that the maximum character length of a word without saccade movement is 20 characters. However, further research by Rayner demonstrated that comprehension of the word was significantly less if the total number of characters is greater than 13 characters. (See Rayner, K. "Eye movements and cognitive processes in reading, visual search, and scene perception." In J. M. Findlay, R. Walker, & R. W. Kentridge (Eds.), *Eye movement research: Mechanisms, processes and applications* (pp. 3-22). Amsterdam: North Holland, 1995) ("Rayner 1995").

Therefore, it is possible to have good recognition of words of up to 13 characters in length from a single fixation that is positioned on a specific character that is off center toward the beginning of the word (e.g., to the left of the middle character for languages that are read from left to right). Words are rarely greater than 13 characters (according to Sigurd, only 0.4% of the words in the English language are longer than 13 characters—see Sigurd, B. et al, "Word Length, Sentence Length and Frequency—ZIPF Revisited", Studia Linguistica 58(1), pp 37-52, Blackwell Publishing Ltd, Oxford UK, 2004) and therefore, for the vast majority of words, it is preferable to limit the number of characters to the right side of the fixation point to 8 characters.

None of the previous research on word recognition has been applied to RSVP. In a conventional RSVP, the optimal fixation position will shift as words of differing lengths are sequentially displayed in the center of the display, resulting in saccade movements as the eyes shift to the optimal fixation position. The reader has to refocus on the display every time a new word appears that is of a different length than the previous word. The reader's eyes will move from one character to the next to find the optimal position, which is also referred to as a recovery saccade. In addition, when a longer word follows a shorter one, the saccadic movement direction will be from right to left. When reading text in lines in a traditional paragraph display, most saccadic movement is from left to right so the reader is accustomed to this type of eye movement. Only occasionally, if the optimal fixation position is not found directly, the reader may have to move back from right to left. Thus conventional RSVP forces the reader to experience saccades which are not normal. Conventional RSVP approaches offer no solution to these problems.

In order to prevent or minimize recovery saccades in an RSVP, it is preferable to display each word such that the optimal fixation position does not shift in the display. The focal point of the reader can then remain fixed on the optimal fixation position, which is a specific point in each word that is determined by the total number of characters or width of the word. This optimal recognition position, hereinafter referred to as the "ORP," can be identified in the display such that the reader's eyes are directed to focus there as the words are serially presented. An RSVP which incorporates an ORP is hereinafter referred to as "ORP-RSVP." With an ORP-RSVP, text can then be presented at a faster rate because no saccades occur during the presentation. In addition, the elimination of saccades reduces eye fatigue and makes it more comfortable, resulting in a better reading experience for the user.

Many application areas benefit from an ORP-RSVP which enables more information to be presented faster in a very small display. It can be utilized not just on computers for faster reading of long texts, but preferably also on portable electronic devices such as mobile phones, smartphones, multi-media players, e-readers, tablet/touchpad or laptop PCs, and other communication devices.

One embodiment of the present invention provides a method for serially displaying text on an electronic display comprising identifying an optimal recognition position for a plurality of words to be displayed and serially displaying the plurality of words such that the optimal recognition position of each word is displayed at a fixed display location on the electronic display. In one embodiment, the optimal recognition position is identified as a character in the word. In another embodiment, the optimal recognition position is identified as a proportionate position relative to the width of the word in pixels. In some embodiments, visual aids are used to mark the fixed display location (e.g., hash marks) and/or an optimal recognition position within the word (e.g., different colored font).

Some embodiments of the invention further comprise using a relative display multiplier for each word based at least in part on word length, the relative display multiplier being used in determining a display time for the word. In some embodiment of the invention, blank elements are inserted between first and second sentences and displayed for a length of time that varies based on a word length of the first sentence. In some embodiments of the invention, words over thirteen characters long are displayed such that a first portion of the word is displayed (along with a hyphen) as a first display element and a second portion of the word is displayed as a second display element.

Some embodiments comprise a computer program product including instructions for displaying text in accordance with principles of the present invention. Some embodiments comprise a computer program product including instructions for preparing and streaming text to be displayed in accordance with principles of the present invention. Some embodiments comprise an apparatus configured to carry out serial text display in accordance with principles of the present invention. Some embodiments comprise an apparatus configured to prepare and stream text to be displayed in accordance with principles of the present invention.

These and other embodiments are more fully described below.

BRIEF DESCRIPTION OF THE DRAWINGS

The novel features of the invention are set forth in the appended claims. However, for purpose of explanation, several aspects of a particular embodiment of the invention are described by reference to the following figures.

FIGS. 2*a*-*d* illustrate the display portion of the embodiment of FIG. 1. FIGS. 2*a* and 2*b* show examples of the display area before presentation of text, and FIGS. 2*c* and 2*d* show two examples of displayed words of different lengths.

DETAILED DESCRIPTION OF THE INVENTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
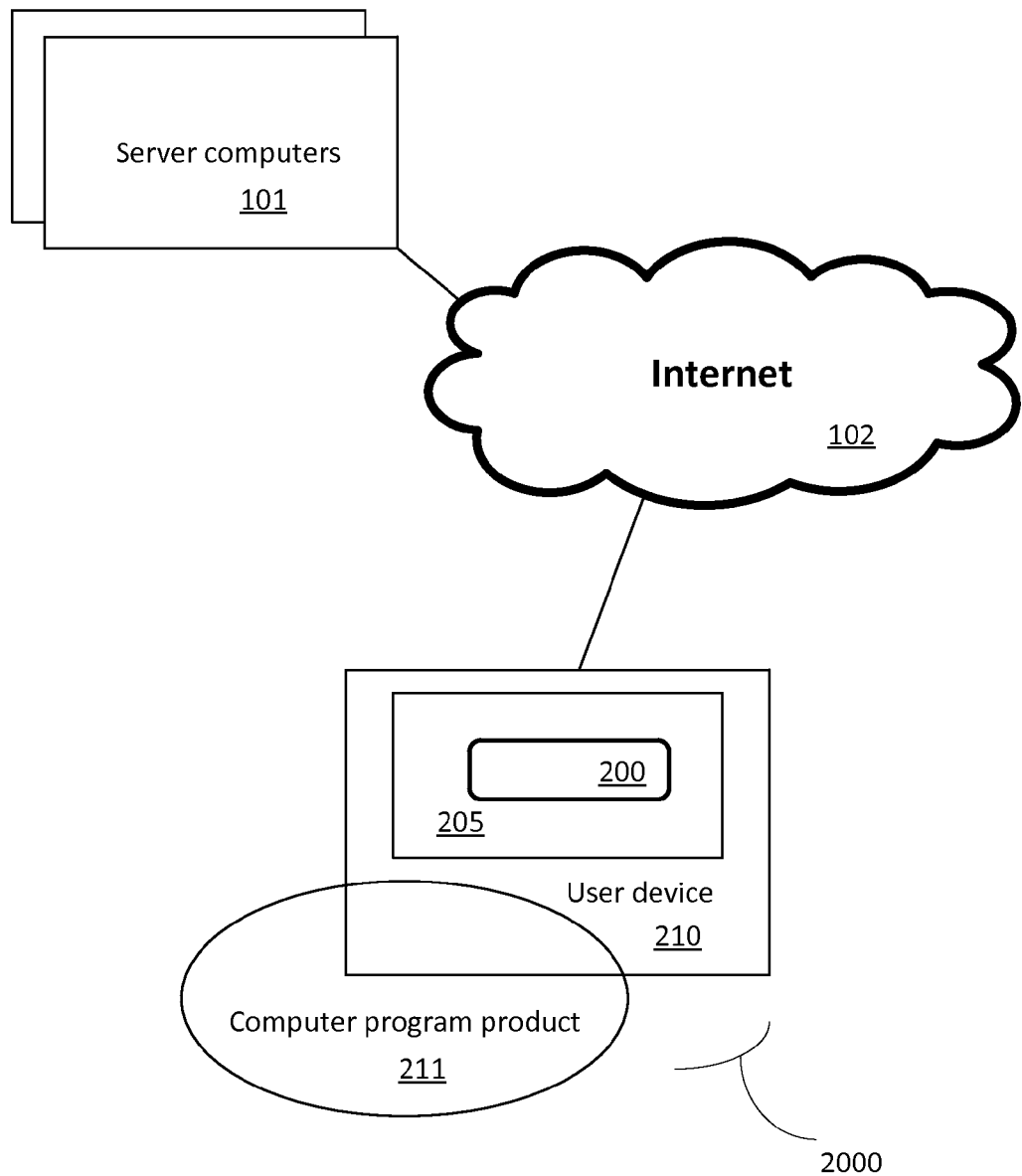
FIG. 1 illustrates a text display system in accordance with an embodiment of the present invention.

FIG. 1 illustrates a text display system 2000 in accordance with an embodiment of the present invention. In this embodiment, the text display system is implemented on an end user device 210, which is configured by computer program product 211 to implement an embodiment of the present invention.

End user device 210 includes a display 205. Computer program product 211 configures device 210 to serially present text in a Rapid Serial Visual Presentation ("RSVP") display area 200 on display 205 (for convenience, referenced herein simply as "RSVP display 200"). User device 210 may include any type of electronic device capable of controlling text display. Some examples include desktop computers and portable electronic devices such as mobile phones, smartphones, multi-media players, e-readers, tablet/touchpad, notebook, or laptop PCs, and other communication devices. In some implementations (e.g., a smart phone or e-reader), the display 205 may be packaged together with the rest of device 210. However, in other implementations, a separate display device (e.g., a monitor) maybe be attached to device 210. While the illustrated embodiment shows a graphical border around RSVP display 200, RSVP display 200 simply refers to a region (e.g., a window) on display 205 where text is serially presented in accordance with an embodiment of the presentation and in particular implementations, RSVP display 200 may or may not be outlined by a graphical border.

In one embodiment, user device 210 has typical computer components including a processor, memory and an input/output subsystem. In the illustrated embodiment, computer program product 211 is loaded into memory (not separately shown) to configure device 210 in accordance with the present invention. In one embodiment, text data may be loaded into memory for text processing and display processing by device 210 as will be further described herein. Text data loaded into memory for text processing and display processing may be retrieved from persistent storage on a user device such as device 210 and/or may be received from one or more server computers 101 through a connection to Internet 102 (or other computer network). In an alternative embodiment, at least some processing/pre-processing of text data for display in accordance with the principles illustrated herein may be carried out by one or more remote computers such as server computers 101 and then sent to end user device 210 for display on RSVP display 200 on display 205. In such an alternative, some or all of a computer program product such as computer program product 211 for implementing an embodiment of the present invention may reside on one or more computers such as server computers 101 that are remote from end user device 210. In some embodiments, the entire computer program product may be stored and executed on remote computers and the results presented within a browser application component (e.g. a media player application) of user device 210 (browser application and media player application not separately shown).

In an embodiment of the invention, text (which includes, for example, strings of characters—e.g., letters, numbers, symbols, etc.—which constitute words, numeric figures, and combinations of both with punctuation marks and symbols) is presented serially (for example, one word at a time) within RSPV display 200. As referenced herein, a "display element" will refer to a group of text data that is displayed at one time within RSPV display 200. In other words, display elements are displayed serially. In the primary embodiment discussed herein, a display element will generally consist of one word. However, in alternative embodiments, two words may be presented as a single display element. Also, in the primary embodiment, two words are sometimes part of a single display element such as, for example, when a number e.g., "9," is displayed together with a unit, e.g. "feet," so that, for example, the text "9 feet" may be constitute a single display element and be presented together.

Also, in some embodiments, a word having a length of greater than thirteen characters is divided into first and second display elements such that a first portion of the word is displayed first (along with a hyphen) and then the second portion of the word is displayed next.

In some embodiments of the present invention, an empirically determined optimal recognition position ("ORP") of each display element is presented at a fixed location of the RSVP display 200. For example, each word of a plurality of words is serially presented and positioned in the display such that the ORP is displayed at a fixed display location within display 200 and this enables recognition of each word in succession with minimal saccade by the reader.

In a first embodiment, hereinafter referred to as the ORP character position method, the optimal recognition position has been determined empirically by positioning the word such that a specific character is located in the ORP. This character is hereinafter referred to as the ORP character, whose position is specified from the beginning of the word. Brysbaert and Nazir had provided recommendations for the ORP character position only for words of 3, 5, 7, and 9 characters in length. Certain embodiments of the present invention rely on having determined ORP character positions for words of 4, 6, 8, and 10-13 characters in length. A ratio based on the ORP character position was created in order to interpolate between the established values for words of 3, 5, 7, and 9 characters in length, and to extrapolate for words of 10-13 characters in length. This ORP character position ratio is determined by the following formula:

ORP Character Position Ratio=(ORP Character Position−1)/Total Number of Text Characters The values of the ORP character position for words of 4, 6, 8, and 10-13 characters in length are determined by keeping the ORP character position ratio between 0.20 to 0.33 and applying the above formula. The resulting values of the ORP character positions, which are summarized in TABLE I, were empirically tested and confirmed by the inventors with 20 subjects utilizing texts displayed according to this embodiment. TABLE I summarizes the ORP character position as the total number of text characters ranges from 3 characters to preferably 13 characters, but not more than 20 characters (note that "characters" in this context—i.e. for purposes of counting the number of characters in a word display element—only include parts of the word itself, e.g., letters, and do not include punctuation characters, even though, as explained in the context of FIG. 6, text may be parsed such that a punctuation mark is included as part of the same display element as a word). Note that the ORP character position shifts progressively further from the middle of the word as the total number of characters increases beyond three characters.

TABLE 1

| Total Number of Text Characters | ORP Character Position | ORP Character Position Ratio |
| --- | --- | --- |
| 3 | 2 | 0.33 |
| 4 | 2 | 0.25 |
| 5 | 2 | 0.20 |
| 6 | 3 | 0.33 |
| 7 | 3 | 0.29 |
| 8 | 3 | 0.25 |
| 9 | 3 | 0.22 |
| 10 | 4 | 0.30 |
| 11 | 4 | 0.27 |
| 12 | 4 | 0.25 |
| 13 | 4 | 0.23 |
| 14-20 | 5 | NA |

While TABLE I specifies a set of values for the ORP based on whole characters, it is possible to have other embodiments in which the ORP is determined as a proportion of the display element's pixel width. In one such alternative (described in detail in the context of FIG. 8) an offset is calculated indicating the pixel offset from the fixed display location for placing a first pixel at the beginning edge of the display element. ("Beginning" refers to the beginning from the perspective of a reader reading in a reading direction of the language associated with the word, e.g., for English, the left edge of the display element is the "beginning")

The average of the ORP character position ratio values in TABLE I yields an average ORP character position ratio of 0.265. This can be used to determine the ORP offset to position a text in terms of pixels from the ORP to the first pixel in the text, according to the following formula:

ORP Offset=(Width*Average ORP Character Position Ratio)+(0.5*Average Character Width)

where Width is the total width of the text (e.g., a word to be displayed) in pixels and Average Character Width is the Width divided by the total number of characters in the text. This will account for the use of proportionally spaced fonts, as both the Width and Average Character Width will change depending upon various combinations of characters. Different formulas or different distributions for the values of the ORP character position can be incorporated into other embodiments. Note that in the ORP position ratio method (sometimes referenced herein as the offset method), the optimal recognition position is at a position that can be determined to be at a specific proportion of the display element's width from the beginning of the word. This position will be referenced herein as the "optimal proportionate position."

Note that although, as used herein, "length" is generally used to reference the length of words in terms of characters and the length of sentences in terms of words, "width" on the other hand is generally used to refer to the width of characters and words in terms of pixels. However, "width" and "length" in these contexts both refer to the same "dimension" of words and characters in the sense that they refer to the dimension extending parallel to the direction of reading.

FIG. 2a shows a basic ORP-RSVP display 200 in accordance with the first embodiment of the present invention. The ORP-RSVP display 200 can accommodate text of up to 20 characters in length without saccades, although it is preferred to limit the display to 13 characters for improved comprehension. Words longer than 13 characters can be hyphenated and displayed as two consecutive segments. Research has confirmed that approximately two-thirds of the users preferred the hyphenated technique over the single display of the full word. Fixed display location 201 is positioned within the display 200 to accommodate at least four characters to its left and can be identified with hash marks 202. Other identifiers such as circles, colors or textures may be used. FIG. 2b shows how a circulating arrow 203 can be used to direct the user's eye to focus at fixed display location 201 before the words are serially presented. A countdown indicator 204 may also be utilized to indicate the amount of time before the words begin to be serially presented.

FIG. 2c illustrates positioning of the word "present" in ORP-RSVP display 200. When the serial presentation begins, the first word is displayed in the ORP-RSVP display 200 such that ORP character 205 is positioned at fixed display location 201. In the example in FIG. 2c, the total number of characters in the word "present" is seven and so, from TABLE I, the $3^{rd}$ character "e" is positioned at fixed display location 201. A colored font, such as a red font, may be utilized to emphasize the ORP character 205 as shown in FIG. 2c. FIG. 2d shows the display of the longer word "presentation", where the $5^{th}$ character is the ORP character 205 and is displayed at fixed display location 201.

Figure 3:
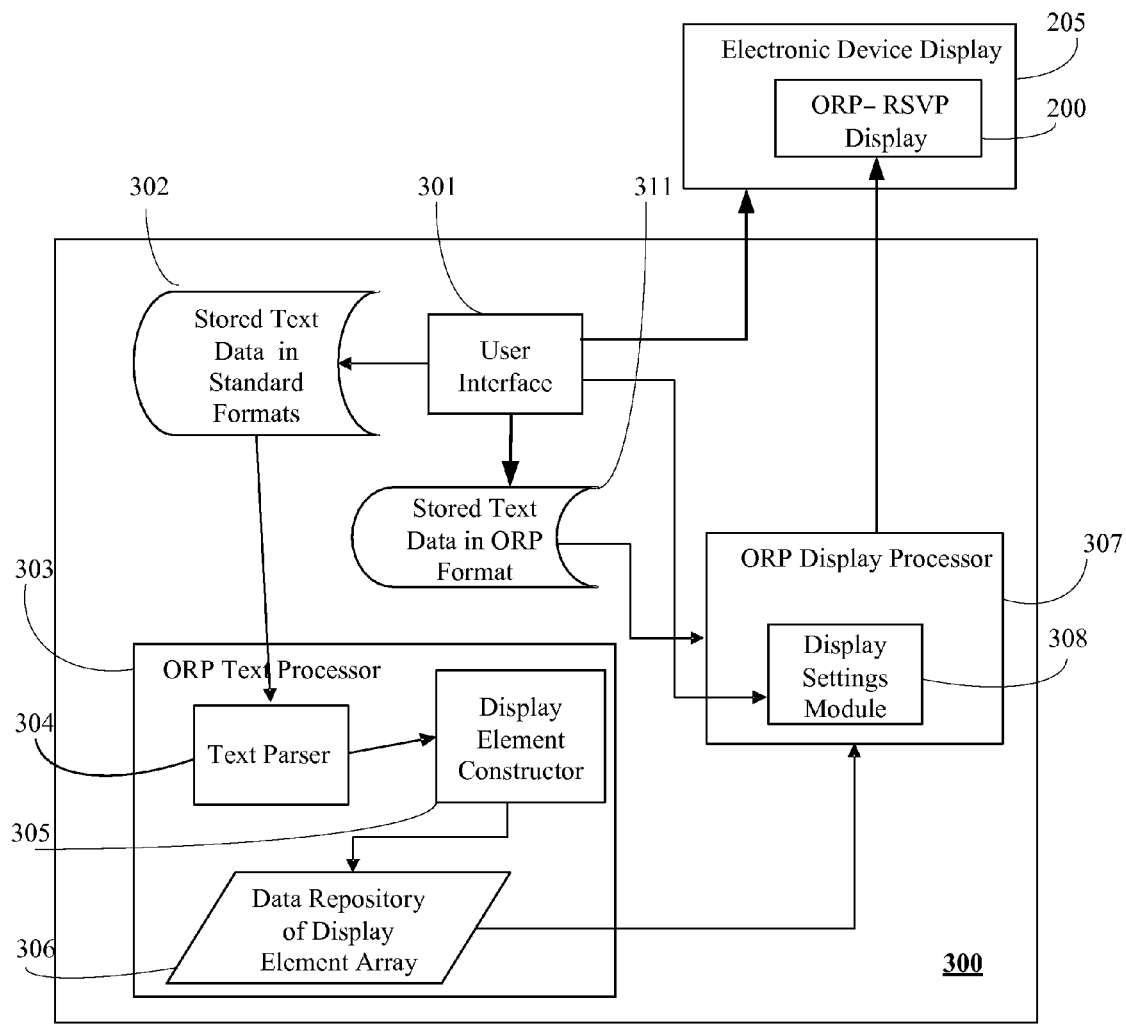
FIG. 3 illustrates an architectural block diagram of an embodiment of the present invention.

FIG. 3 is a block diagram of computer application 300 in accordance with an embodiment of the present invention to be utilized on an electronic device which includes a digital processor, memory, and a display (and/or that is adapted for communication with a separate display). Computer application 300 is designed to accomplish text display in an ORP-RSVP display such as ORP-RSVP display 200 on a display such as display 205. User interface subsystem 301 provides features for user interaction via a graphical windowing system, including, in certain cases, windows, menus, dialogs, and similar features, as well as input selection means from an input device such as a mouse, keypad, touchpad, touch stick, joy stick, touch-screen, natural user interface, or voice recognition system. User interface 301 enables the user to select text to be displayed, either in standard formats or text that has been pre-processed into the necessary ORP display format, as well as to make or change display settings. Text to be processed by application 300 may be stored in memory 302 in a variety of standard formats, such as xml, txt, pdf, and doc. The ORP text processor subsystem 303 converts the stored text into the format necessary for display by ORP display processor 307. It contains text parser subsystem 304, display element constructor 305, and data repository 306 which stores the processed text as display elements with display parameters. ORP display processor subsystem 307 accesses the text from the in-memory data repository 306 or from a stored ORP file 311 and prepares it for RSVP presentation in the ORP-RSVP display 200 on the electronic device display 205. The ORP display processor 307 also includes, in this example, display settings module 308, which enables the user to make or change display settings such as the overall speed in average words-per-minute or average display time of words.

Figure 4:
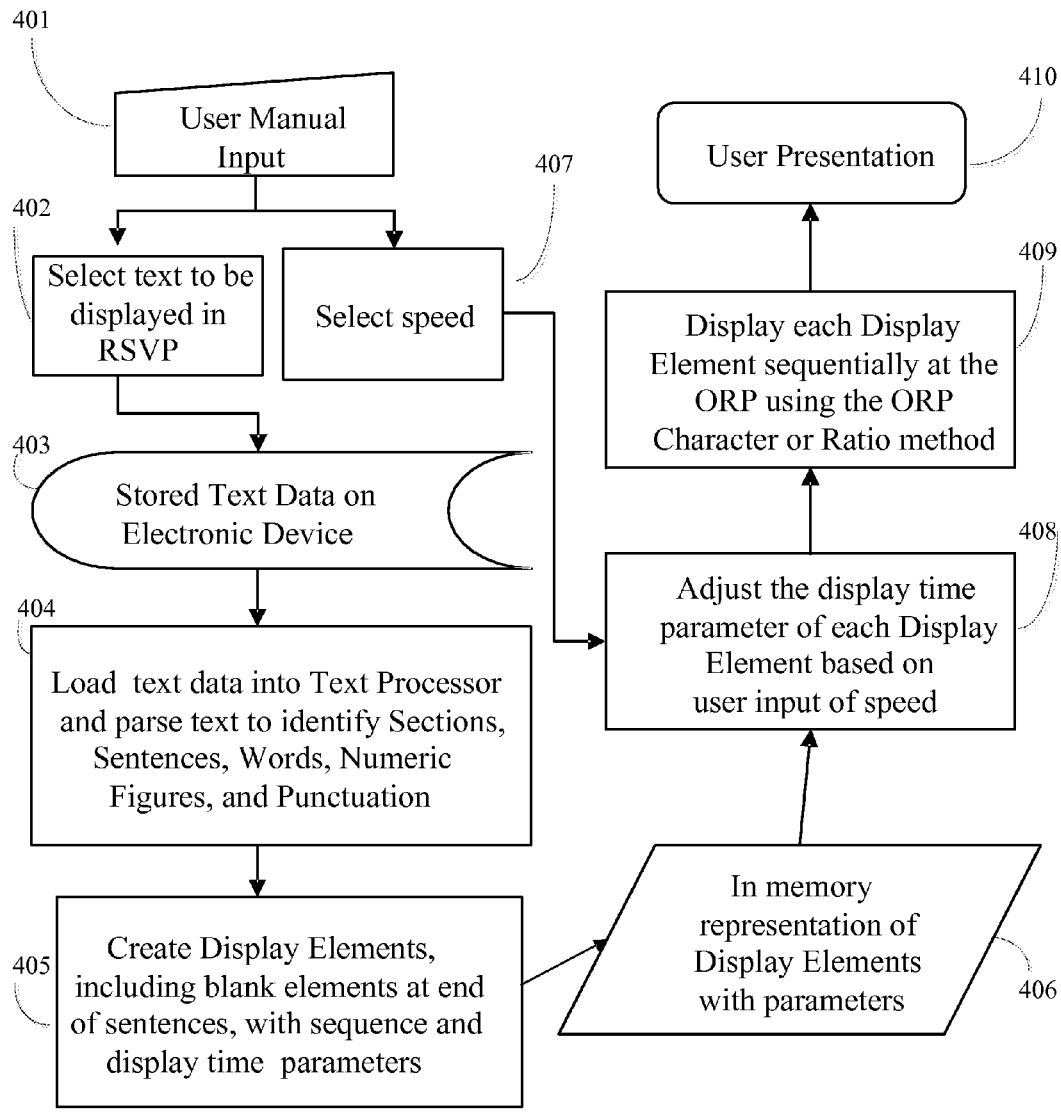
FIG. 4 provides a flow chart architectural diagram of the embodiment of FIG. 3.

FIG. 4 provides a high level flow chart of processing 400 which implements information processing of computer application 300 of FIG. 3. A user provides user manual input 401 which is received by user interface 301 (see FIG. 3). In response to user manual input 401, step 402 selects the text to be presented. For example, a selection of a text file from a list may be made using a mouse, keypad, or touch-screen. A selection may also be made from within a full text that is currently displayed. In this example, it is assumed text selected to be displayed is stored on the electronic device. Step 403 retrieves the stored text data. However, in alternative examples, the text may be retrieved from a remote device. ORP text processor 303 then initiates step 404 to load the data and uses text parser 302 to parse the text to identify sections (such as paragraphs, chapters, etc.), sentences, words, numeric figures, and punctuation marks. Display element constructor 305 then initiates step 405 to create an array sequence of display elements, including the insertion of a blank element at the end of each sentence.

Step 405 also calculates parameters for the display time of each display element. While, in alternative embodiments, it is possible to display each element for the same amount of time, it has been demonstrated empirically that a longer display time is beneficial for comprehension of longer words. It has also been demonstrated empirically that a longer pause between sentences is beneficial for comprehension of longer sentences.

Figure 5A:
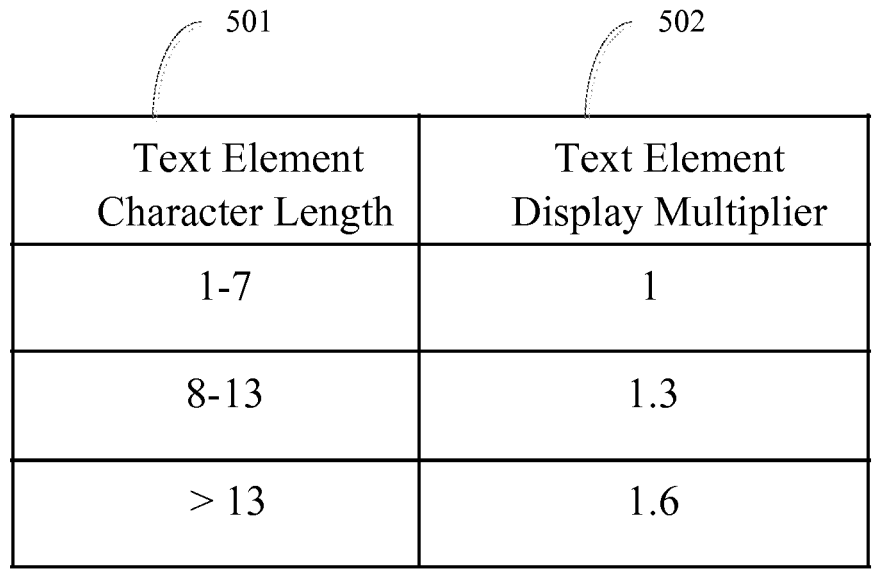
FIGS. 5*a* and 5*b* illustrate display time multipliers for display elements (text and blank elements).
Figure 5B:
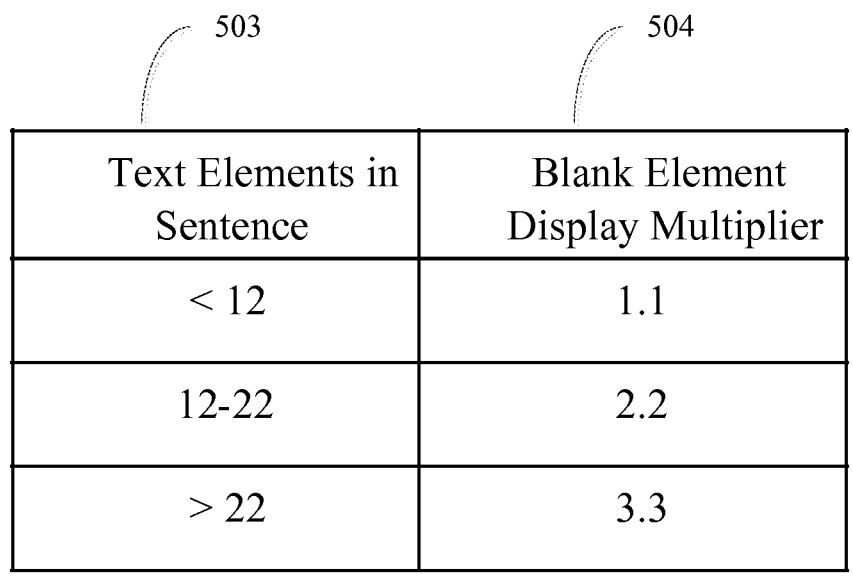

FIG. 5a provides a set of recommended values for a text element display multiplier 502 as a function of the text element character length 501. FIG. 5b provides a set of recommended values for the blank element display multiplier 504 as a function of the number of text elements in the sentence 503. The calculated display parameters are then stored for each display element in the array to create the in-memory representation 406, which may also be stored as a file 311 in non-volatile memory.

Returning to the description of FIG. 4, step 408 adjusts the display time parameter of each display element based on a setting of the overall speed which has been selected at step 407 based on user manual input 401. As referenced above, the ORP display processor 307 includes display settings module 308 which stores the display settings, including a profile that has been previously selected by the user. In addition to the overall speed setting, the display settings may also include options for other settings, for example the initial display speed (providing a ramp from a lower speed at the start to the higher overall speed setting), the color of the display background, the color or texture of the ORP indicators, and the text font type and size. The ORP display processor 307 then carries out step 409 to display each display element sequentially for its adjusted display time with its ORP character positioned at fixed display location 201 in ORP-RSVP display 200 on the electronic device display 205 if using the ORP character position method. If using the ORP ratio position method, the ORP display processor 307 carries out step 409 to display each display element sequentially for its adjusted display time with the first character positioned at a distance from fixed display location 201 equal to the amount of the ORP offset calculated for that specific display element.

Figure 6:
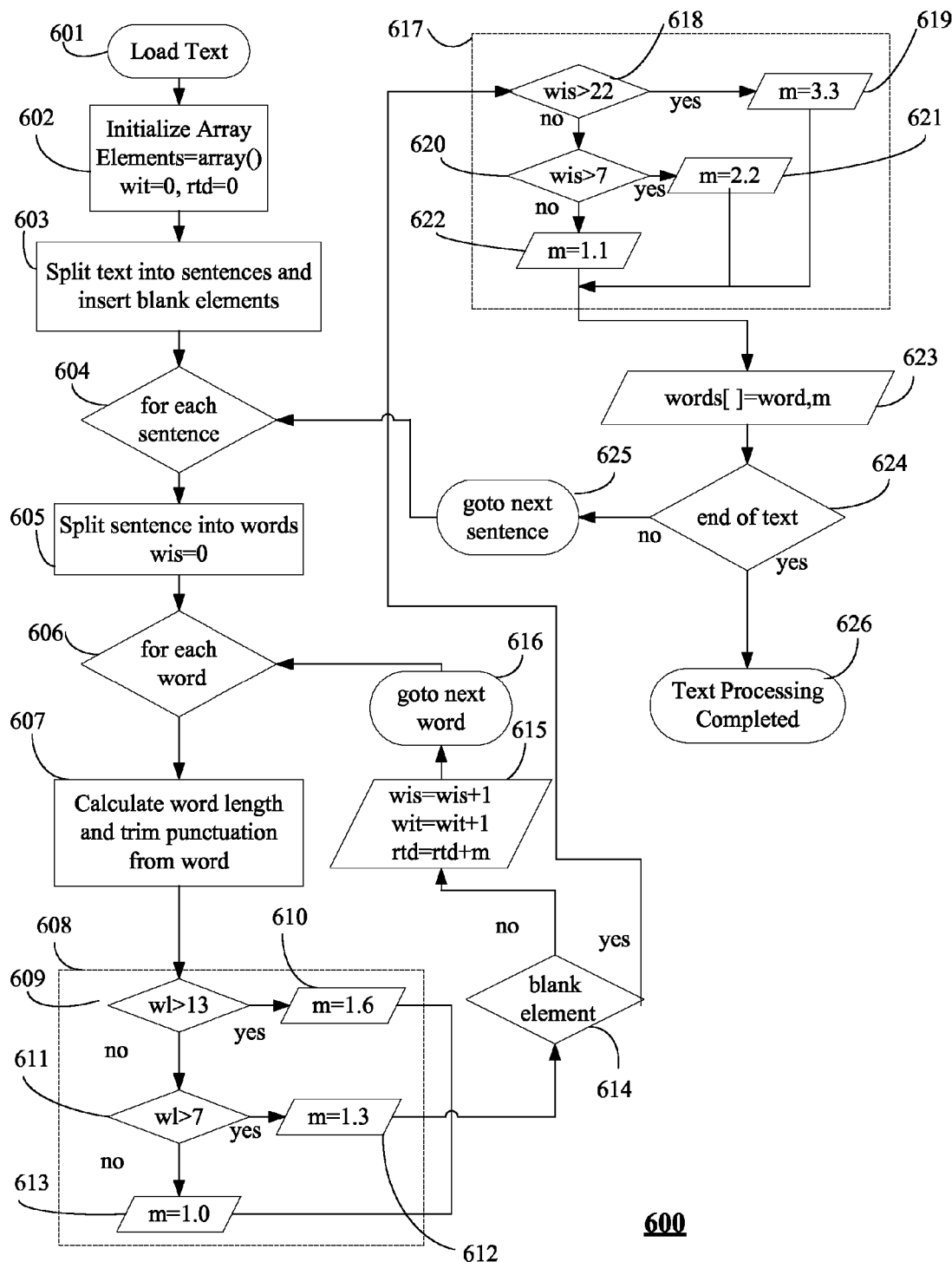
FIG. 6 is a flow chart diagram of text pre-processing in accordance with an embodiment of the present invention.

FIG. 6 provides a flow chart of processing 600 which illustrates further details of processing carried by computer application 300 of the embodiment of FIG. 3. Specifically, processing 600 is carried out by OPR text processor 303 of FIG. 3. Step 601 receives text. Step 602 creates an empty array of ordered pairs for display elements and their display parameters. Counters for words-in-text ("wit"), and relative text duration ("rtd") are initialized at 0. Step 603 parses the text to split it into sentences and inserts blank elements at the end of each sentence. Step 604 selects the sentence to be processed by step 605 (which is either the first sentence on an initial processing loop, or a next sentence in response to step 625). For that sentence, step 605 spits it into words and initializes the counter for words-in-sentence ("wis") at zero. Step 606 selects the word to be processed by step 607 (which is either the first word on an initial processing loop for a particular sentence, or a next word in response to step 616). For that word, step 607 calculates the word length ("wl") with punctuation trimmed from that word. In this embodiment, wl is calculated without including punctuation for purposes of calculating a display multiplier and determining an optimal recognition position character or offset (described later). However, alternative embodiments may utilize punctuation (or certain types of punctuation) for calculating certain display parameters, particularly to the extent particular empirical results dictate that factoring in punctuation can benefit reading results.

Steps 608 then set the multiplier ("m") based on the value of wl, progressively testing wl until the appropriate value of m is selected. The values of m specified in steps 608 have been determined empirically, but different values could be utilized in other embodiments to provide for additional display time for words of varying length. Step 609 determines if wl is greater than thirteen. If the result of step 609 is yes, then step 610 sets m to 1.6; if the result of step 609 is no, then step 611 determines whether wl is greater than seven. If the result of step 611 is yes, then step 612 sets m to 1.3; if the result of step 611 is no, then step 613 sets m to 1.0. Once m is set (step 610, 612, or 613), step 614 then tests to see if the display element is a blank element (wl=0); if the result of step 614 is no, then step 615 increments the wis and wit counters by 1 and increments the rtd counter by the value of m. Step 616 then directs selection of the next word and processing 600 returns to step 606 so that the next word can be processed.

If the result of step 614 is yes, (i.e., the current display element is a blank element), the end of a sentence has been reached (step 603 inserts blank elements between sentences). Steps 617 then set the blank element multiplier based on the value of wis, progressively testing the value until the appropriate value of m is selected. The values of the wis thresholds and corresponding values of m specified in steps 617 have been determined empirically but different values could be utilized in other embodiments to provide for additional display time of the blank element for sentences of varying length. Step 618 determines whether wis is greater than twenty-two. If the result of step 618 is yes, then step 619 sets m to 3.3. If the result of step 620 is no, then step 620 determines whether wis is greater than seven. If the result of step 620 is yes, then step 621 sets m to 2.2. If the result of step 620 is no, then step 622 sets m to 1.0. Once m is set for the end-of-sentence blank element (step 619, 621, or 622), step 623 stores all display elements (including word display elements processed by steps 608 and the end-of-sentence blank display element processed by steps 618) for that sentence in pairs with corresponding multiplier values in the array 306.

Step 624 determines whether the end of the text has been reached. If the result of step 624 is no, then processing 600 returns to step 604 so that the next sentence can be processed. If the result of step 624 is yes, then text processing ends at step 626.

Figure 7:
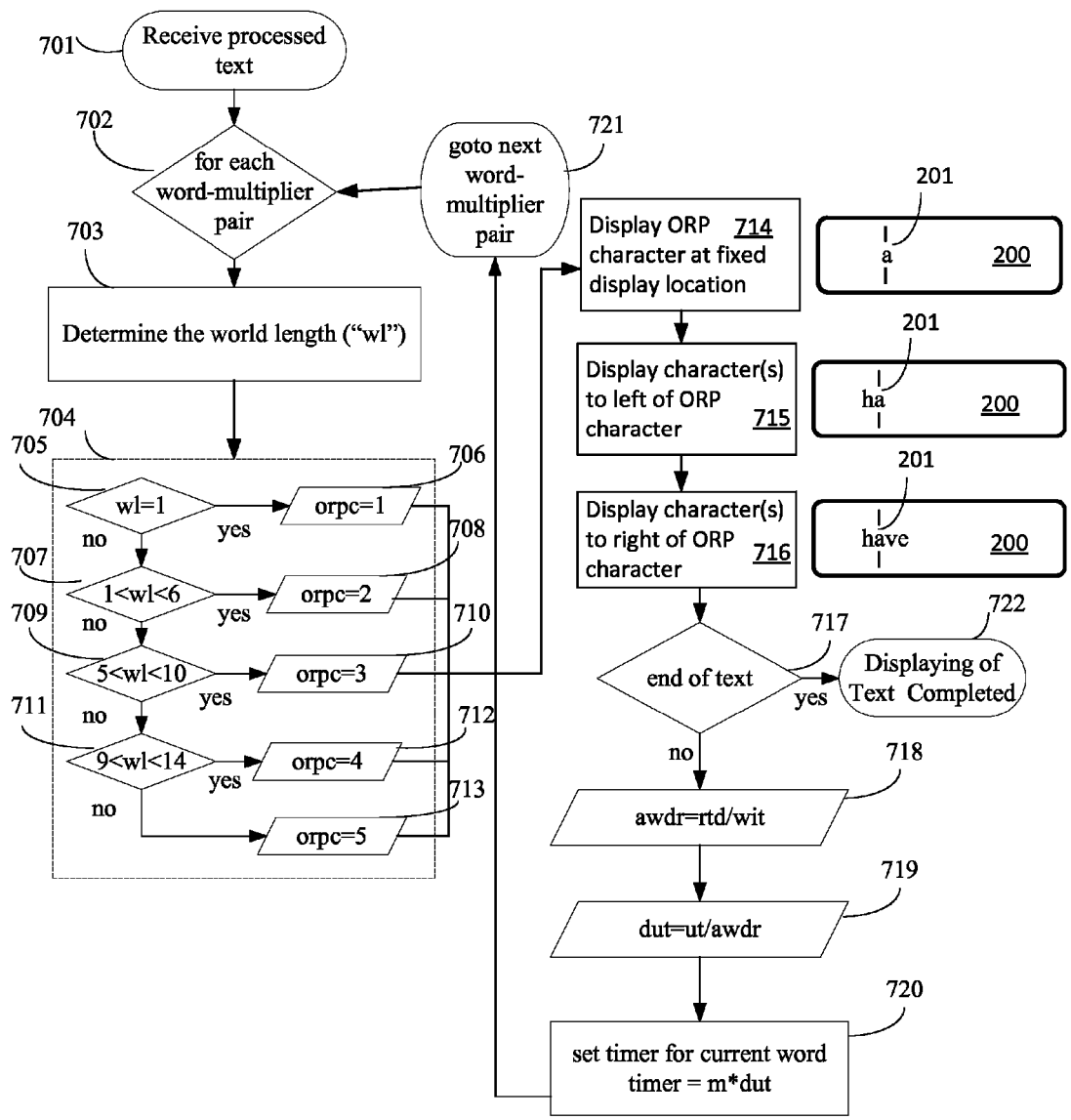
FIG. 7 is a flow chart diagram of text display processing according to an embodiment of the present invention.

FIG. 7 provides a flow chart of processing 700 which illustrates further details of processing carried by computer application 300 of the embodiment of FIG. 3. Specifically, processing 700 is carried out by OPR display processor 307 of FIG. 3. In the embodiment illustrated in FIG. 7, ORP display processor 307 implements the ORP character position method previously described. In particular, an ORP character is identified and placed at fixed display location 201. Processing 700 begins at step 701 which receives processed text from ORP text processor 303 or from stored text data 311.

Step 702 selects and loads the word-multiplier pair to be processed for display (which is either the first pair in the stored array referenced in 623 of FIG. 6 on an initial processing loop, or a next pair in response to step 721). Step 703 determines the length in characters ("word length" or "wl") of the word to be displayed. As previously discussed in the context of FIG. 6, the word length in this embodiment is the number of characters excluding punctuation. Note that, in alternative embodiments, the word length calculated at step 607 of FIG. 6 could be stored in the word array (along with the display element and the word multiplier) so that it does not have to be recalculated in step 703.

Steps 704 then sets the ORP character ("orpc") based on the value of wl, progressively testing the length until the appropriate value of orpc is selected for that word, in accordance with the recommendations in TABLE I. Step 705 determines if wl=1. If the result of step 705 is yes, then step 706 sets the orpc to 1 and processing 700 proceeds to step 714. If the result of step 705 is no, then step 707 determines if wl is greater than 1 and less than 6. If the result of step 707 is yes, then step 708 sets the orpc to 2 and processing 700 proceed to step 714. If the result of step 707 is no, then step 709 determines if wl is greater than 5 and less than 10. If the result of step 709 is yes, then step 710 sets the orpc to 3 and processing 700 proceeds to step 714. If the result of step 709 is no, then step 711 determines if wl is greater than 9 and less than 14. If the result of step 711 is yes, then step 712 sets the orpc to 4 and processing 700 proceeds to step 714. If the result of step 711 is no, the step 713 sets the orpc to 5 and processing 700 proceeds to step 714.

Step 714, displays ORP character (as selected by step 706, 608, 710, 712, or 713) at fixed display location 201 in ORP display 200 (as illustrated by way of example in the window just to the right of step 714 in FIG. 7). Step 715 then displays the characters to the left of the ORP character one by one with the offset defined by the font width (as illustrated by way of example in the window just to the right of step 715 in FIG. 7). Step 716 then displays characters to the right of the ORP character are then displayed in the same manner (as illustrated by way of example in the window just to the right of step 716 in FIG. 7).

Step 717 then tests to see if the end of the text has been reached. If the result of step 717 is no, then step 718 calculates the average word relative duration ("awdr") by dividing the rtd by the wit. Step 710 then calculates the default update time ("dut") by dividing the update time ("ut") (which is retrieved from display settings module 308 of FIG. 3) by the awdr. Step 720 then sets a timer and the word is displayed for a time equal to the product of the relative time multiplier and the dut. Step 721 directs that that the next word-multiplier pair is selected and processing 700 returns to step 702 so that the next word-multiplier can be processed. If the result of step 717 is yes, then display processing ends at step 722.

Figure 8:
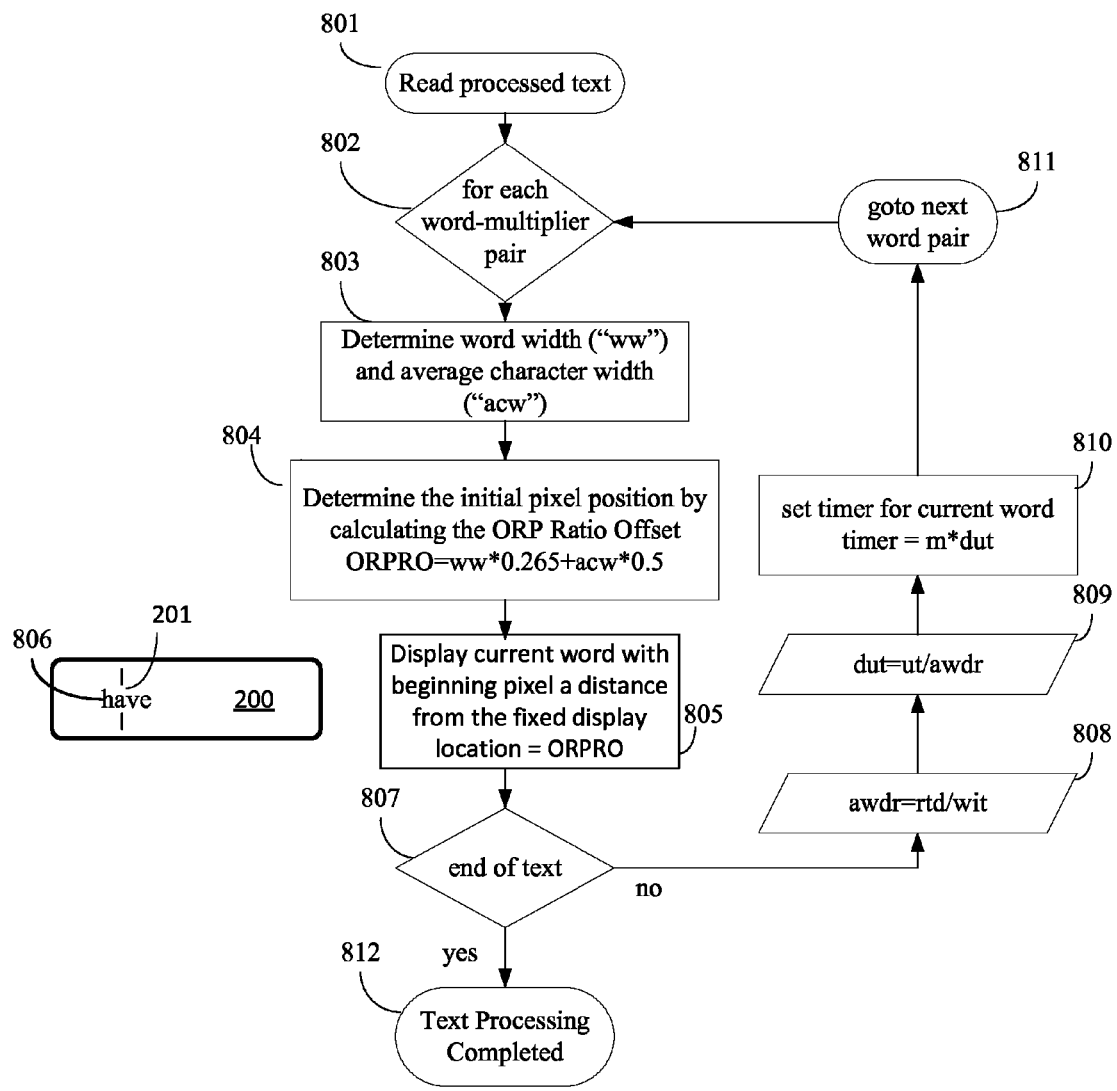
FIG. 8 is a flow chart diagram of processing and display of text according to an alternative embodiment of the present invention.

FIG. 8 provides a flow chart of processing 800 in accordance with an alternative to the embodiment of FIG. 7 for the processing of ORP display processor 307. Specifically, in the embodiment of FIG. 8, the ORP ratio position method described earlier is used. Rather than using an identified ORP character, processing 800 utilizes a proportionate position for the optimal recognition position which, multiplied by the word with, provides an offset value from the fixed display location for placing a pixel that is at the beginning of the word.

Step 801 receives text from the ORP text processor 303 or from text data store 311. Step 802 selects and loads the word-multiplier pair to be processed for display (which is either the first pair in the stored array referenced in 623 of FIG. 6 on an initial processing loop, or a next pair in response to step 721). Step 803 then calculates the total width of the word ("ww") in pixels and the average character width ("acw") in pixels. As previously discussed, the word "width" in this context is calculated along the same dimension (in line with the reading direction) as is the word "length" referenced in the context earlier figures. The difference is that as used herein, "ww" is measured in pixels and "wl" is measured in number of characters.

Step 804 then determines the first pixel position for the display of the word in ORP-RSVP display 200 (an exemplary ORP display 200 is shown just to the left of step 805 in FIG. 8) by calculating the ORP ratio offset ("ORPRO"). In step 805, the word is displayed with the first pixel of the first character located at the ORPRO position 806 (which is a distance in pixels equal to the ORPRO from the fixed display location 201). This may be referenced as the "beginning pixel" of the word from the perspective of a reading direction of a reader of the display. Note that, for left to right languages, the beginning pixel is at the left edge of the word. Depending on the shape of the beginning character, there may be multiple pixels located a distance of ORPRO from the fixed display location (for example, in many fonts, the letter "b" would include several pixels at the left most edge of the word). As used herein, the "beginning pixel" will simply refer to any pixel at the beginning edge of the word.

When the beginning pixel is displayed at the ORPRO from fixed display location 201, the ORP of the word, which in this case is identified as the optimal proportionate position along the width of the word (rather than being identified as a particular character), will be displayed at fixed display location 201.

Step 807 tests to see if the end of the text has been reached. If the result of step 807 is no, then step 808 calculates the average word relative duration ("awdr") by dividing the rtd by the wit. Step 809 then calculates the default update time ("dut") by dividing the update time ("ut"), which is retrieved from the display settings module 308, by the awdr. Step 810 then sets a timer and the word is displayed for a time equal to the product of the relative time multiplier and the dut. Step 811 directs that the next word-multiplier pair is selected and processing 800 returns to step 802 so that the next word-multiplier can be processed. If the result of step 807 is yes, then display processing 800 ends at step 812.

The example of FIG. 8 uses the average position ratio of character position ratios based on the values in TABLE I. However, as previously indicated other values could be used while still achieving benefits of the present invention. Such values may result in somewhat different proportions of a word being displayed to the left (for left to right languages) of the fixed display location. In some alternative embodiments, the proportion of a word (in particular, at least words that are greater than four characters in length) that is displayed from the word's beginning to the fixed display location is greater than or equal to 0.2 and less than or equal to 0.45.

As an alternative to processing all text before beginning the display processing, it is possible to display each display element (e.g., a word) after it has been processed. Referencing such an alternative in the context of modifying the processing order of steps shown in FIG. 6 and FIG. 7 (which implements the ORP character position method), the order of steps would be modified as follows: After step 615, the processing would proceed to step 703. After step 720, then the processing would return to step 606 in order to prepare the next word for display. If step 614 determined that it is a blank element, then step 617 would proceed in order to prepare the blank element for display in step 714. Then the processing would return to step 624 to continue the processing of the next sentence or it reaches the end of text processing and display processing.

Referencing such an alternative in the context of modifying the processing order of steps shown in FIG. 6 and FIG. 8 (which implements the ORP ratio position offset method), after step 615, the next step would be step 803. After step 810, the processing would then return to step 606 in order to prepare the next word for display. If step 614 determined that it was a blank element, then step 617 would proceed in order to prepare the blank element for display in step 810. Then the processing returns to step 624 to continue the processing of the next sentence or it reaches the end of text processing and display processing.

In serial text display, saccades are most noticeably a problem for words that are five or more characters in length. Therefore, a preferred embodiment of the present invention places the ORP at the fixed display location at least for display elements that are five or more characters in length. For such display elements (and for display elements of length four), the optimal recognition position is off-center toward the beginning of the display element (from the perspective of a reader of the display). However, while display of the ORP at the fixed display location for words that are fewer than five characters length is not necessary for achieving the benefits of particular embodiments of the invention, in a preferred embodiment, words of lengths four or less are also displayed using the ORP character position method or the ratio position offset method (which, for word lengths of three or less, will not necessarily result in the fixed display location being off center toward the beginning of the word). However, when such words (length four or less) are displayed at the fixed display location, exactly which character or proportionate position of these words is displayed at the fixed display location is not necessarily critical for minimizing saccades. At the same time, however, displaying words of length four or less such that their optimal recognition position is at the fixed display location does provide some smoothing benefit in that eye displacement from one word to the next is reduced, and therefore a preferred embodiment places an optimal recognition potions of all words, including words of length four or less at the fixed display location.

Figure 9:
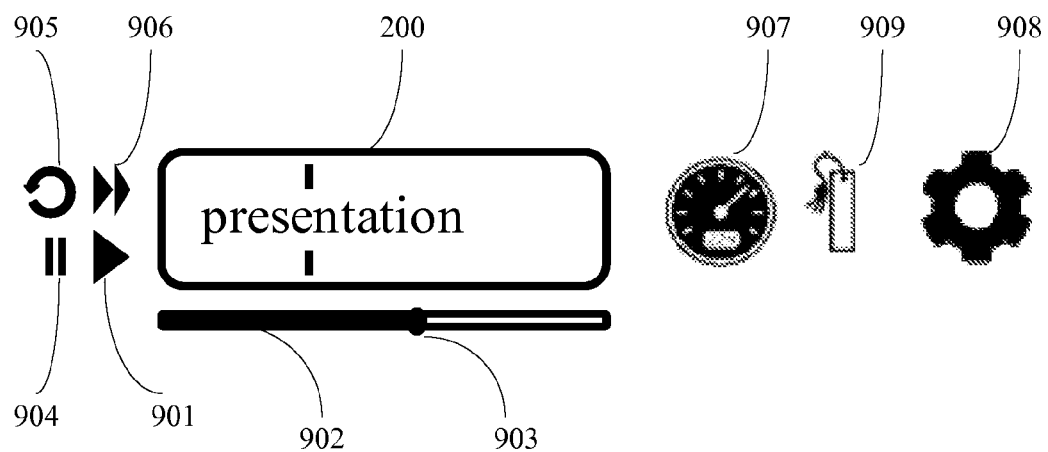
FIG. 9 shows a display in accordance with an embodiment of the present invention, including user controls and indicators.

FIG. 9 illustrates several features that can be added to a basic embodiment of the present invention to improve its effectiveness. User interface 301 and ORP display 200 can be enhanced to enable the user to interact with the display process. As illustrated in FIG. 9, standard controls including starting control 901, pausing control 904, repeating control 905, and fast forwarding control 906 to control display of the text can be provided. A visual indicator 902 can be provided to indicate the progress of the display as a fraction of the total amount of text to be displayed. A slider 903 could also be used to enable jumping to any point in the text. An indicator 907 of the display speed in average words per minute could be provided, which could also enable the user to change the speed during the presentation. A bookmark icon 909 could enable the user to click and set a bookmark during the presentation, and provide the means to restart the presentation at the point that the bookmark was set. A settings icon 908 could be provided to enable the user to change for preferences for the presentation, such as the initial display speed, the color of the display background, the color or texture of the ORP indicators, and the text font type and size.

Other embodiments would enable the invention to be deployed on a variety of electronic devices, such as various computer operating systems, mobile phone operating systems, video gaming platforms, and portable electronic devices such as digital watches, cameras, and music players. While the basic embodiment described herein provides for ORP processing of text that is stored locally on the electronic device, it is possible that the text in a standard format or preprocessed ORP format could be streamed to the electronic device from a server via a wired or wireless network connection. While a preferred embodiment of the present invention is the display of text on small displays, if a large display is available then it would be possible to display the full text in a companion display, such that the progress through the text can be indicated by a moving highlight that corresponds to the word being currently display in the ORP Display.

While the present invention has been particularly described with respect to the illustrated embodiments, it will be appreciated that various alterations, modifications and adaptations may be made based on the present disclosure and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A method of displaying text on an electronic display, the text being dividable into a plurality of respective display elements, at least some of the plurality of respective display elements corresponding to respective words, a word comprising a recognizable set of one or more characters, at least some of the words having an optimal recognition position, the method comprising:

serially displaying, on the electronic display, a plurality of respective display elements such that an optimal recognition position of at least some display elements of the plurality of respective display elements is displayed at a substantially same location on the electronic display, referred to as a fixed display location, wherein, the at least some display elements are displayed such that the fixed display location is off-center toward the beginning of a displayed display element from the perspective of a reader of the electronic display.

2. The method of claim 1 wherein the at least some display elements include display elements having a length of greater than three characters.

3. The method of claim 1 wherein the at least some display elements include display elements having a length of greater than four characters.

4. The method of claim 1 wherein a character is at least one of a group consisting of an alphabetic character, a numeric character, and a symbolic character.

5. The method of claim 1 wherein the optimal recognition position is identified as a character within a display element, referred to as an optimal recognition position character, and the optimal recognition position character is displayed at the fixed display location.

6. The method of claim 5 wherein if a total number of characters in the display element is three, four, or five, then the optimal recognition position character is the second character in the display element.

7. The method of claim 5 wherein if the total number of characters in the display element is six, seven, eight, or nine, then the optimal recognition position character is the third character in the display element.

8. The method of claim 5 wherein if the total number of characters in the display element is ten, eleven, twelve, or thirteen, then the optimal recognition position character is the fourth character in the display element.

9. The method of claim 8 wherein if the total number of characters is fourteen, fifteen, sixteen, seventeen, eighteen, nineteen or twenty, then the optimal recognition position character is the fifth character in the display element.

10. The method of claim 1 wherein the optimal recognition position of a display element of the at least some display elements is located at a position, referred to as an optimal proportionate position, along a reading direction of the display element that is a distance in pixels from a beginning of the display element, the distance in pixels being a proportion of the display element's pixel width.

11. The method of claim 10 wherein the proportion of the display element's pixel width is a function of at least the display element's number of characters and an empirically determined recognition position ratio.

12. The method of claim 11 wherein the proportion of the display element's pixel width is equal to the empirically determined recognition position ratio added to a quotient of 0.5 divided by the number of characters in the display element.

13. The method of claim 12 wherein the empirically determined recognition ratio is an average position ratio of respective optimal recognition position characters for respective display elements from a length of three characters to a length of at least thirteen characters.

14. The method of claim 13 wherein the average position ratio is equal or substantially equal to 0.265.

15. The method of claim 10 wherein the distance in pixels from the beginning of the display element is greater than or equal to 0.20 and less than or equal to 0.45 of the display element's total width.

16. The method of claim 11 wherein the optimal proportionate position provides an offset amount for a pixel at the beginning of the display element, referred to as a beginning pixel, the method further comprising displaying the display element such that the beginning pixel of the display element is at a position that is the offset amount away from the fixed display location.

17. The method of claim 16 wherein the offset amount in pixels is equal to the empirically determined position ratio multiplied by a width of the display element in pixels plus one half of the average character width in pixels of characters in the display element, rounded to the nearest whole pixel number.

18. The method of claim 1 wherein a word greater than thirteen characters is divided into at least first and second display elements, the first display element including a first portion of the word and a hyphen, the second display element including a second portion of the word, the method further comprising:

displaying the first display element and second display element sequentially.

19. A computer implemented method of processing text data to obtain processed text usable for serial text presentation on an electronic display, each step of the method using one or more computers, the method comprising:
   parsing the text data to identify at least words and sentences;
   creating respective display elements for displaying respective words identified from the text data;
   associating respective display data with the respective display elements, the respective display data being usable to display the respective display elements such that, for at least some display elements of the respective display elements, an optimal recognition position of the display element is displayed at a same location on the electronic display, referred to as a fixed display location; and
   electronically communicating the respective display elements and the respective display data for serially displaying the respective display elements on the electronic display.

20. A computer program product for displaying text on an electronic display, the computer program product comprising executable instructions in a non-transitory computer readable medium, the text being dividable into a plurality of display elements, at least some of the plurality of display elements corresponding to words, a word comprising a recognizable set of one or more characters, at least some of the words having an optimal recognition position, the executable instructions comprising instructions for:
   serially displaying, on the electronic display, a plurality of respective display elements such that the optimal recognition position of at least some display elements of the plurality of respective display elements are displayed at a substantially same location on the electronic display, referred to as a fixed display location, wherein, for at least display elements having more than four characters, a display element is displayed such that the fixed display location is off-center toward the beginning of the displayed display element from the perspective of a reader of the electronic display.

21. The computer program product of claim 20 wherein the at least some display elements include display elements having a length of greater than three characters.

22. The computer program product of claim 20 wherein the at least some display elements include display elements having a length of greater than four characters.

23. The computer program product of claim 20 wherein the instructions are for identifying the optimal recognition position as a character within a display element, referred to as an optimal recognition position character, and the instructions further comprise instructions for displaying the optimal recognition position character at the fixed display location.

24. The computer program product of claim 20 wherein the instructions are for displaying a display element such that the optimal recognition position of a display element of the at least some display elements is located at a position, referred to as an optimal proportionate position, along a reading direction of the display element that is a distance in pixels from a beginning of the display element, the distance in pixels being a proportion of the display element's pixel width.

25. The computer program product of claim 24 wherein the proportion of the display element's pixel width is a function of at least the display element's number of characters and an empirically determined recognition position ratio.

26. The computer program product of claim 25 wherein the proportion of the display element's pixel width is equal to the empirically determined recognition position ratio added to a quotient of 0.5 divided by the number of characters in the display element.

27. The computer program product of claim 25 wherein the empirically determined recognition ratio is an average position ratio of respective optimal recognition position characters for respective display elements from a length of three characters to a length of at least thirteen characters.

28. The computer program product of claim 27 wherein the average position ratio is equal or substantially equal to 0.265.

29. The computer program product of claim 24 wherein the distance in pixels from the beginning of the display element is greater than or equal to 0.20 and less than or equal to 0.45 of the display element's total width.

30. The computer program product of claim 24 wherein the optimal proportionate position provides an offset amount for a pixel at the beginning of the display element, referred to as a beginning pixel, the method further comprising displaying the display element such that the beginning pixel of the display element is at a position that is the offset amount away from the fixed display location.

31. The computer program product of claim 30 wherein the offset amount in pixels is equal to the empirically determined position ratio multiplied by a width of the display element in pixels plus one half of the average character width in pixels of characters in the display element, rounded to the nearest whole pixel number.

32. The method of claim 1 further comprising providing a visual aid to mark the fixed display location.

33. The method of claim 32 wherein the visual aid comprises vertical lines above and below the fixed display location.

34. The method of claim 32 wherein providing the visual aid comprises using a different color font for a character displayed at the fixed display location than is used for other characters.

35. The computer program product of claim 20 wherein the executable instructions further comprise instructions for providing a visual aid to mark the fixed display location.

36. The computer program product of claim 35 wherein the visual aid comprises vertical lines above and below the fixed display location.

37. The computer program product of claim 35 wherein providing the visual aid comprises using a different color font for a character displayed at the fixed display location than is used for other characters.

38. The method of claim 1 wherein the text data is parsed into at least words and sentences, the method further comprising:
   displaying a blank element between an end of a first sentence and a beginning of a second sentence for a display time that is determined at least in part by a number of words in the first sentence.

39. The method of claim 38 wherein the display time for the blank element is a first amount if the number of words in the first sentence is less than or equal to a first predetermined number and the display time for the blank element is at least a second amount if the number of words in the first sentence is greater than the first predetermined number, the second amount being greater than the first amount.

40. The method of claim 39 wherein the display time for the blank element is at least a third amount if the number of words is greater than a second predetermined number, the third amount being greater than the second amount and the second predetermined number being greater than the first predetermined number.

41. The method of claim 40 wherein the first predetermined number is twelve and the second predetermined number is twenty-two.

42. The method of claim 19 wherein the at least some display elements include display elements having a length of greater than three characters.

43. The method of claim 19 wherein the at least some display elements include display elements having a length of greater than four characters.

44. The method of claim 19 further comprising:
creating a plurality of blank display elements, a blank display element of the plurality of blank display elements being for display between an end of a first sentence and a beginning of a second sentence;
determining a number of words in the first sentence; and
using the number of words in the first sentence to determine a relative display time parameter for the blank element such that a relative display time for the blank element is a first amount if the number of words in the first sentence is less than or equal to a first predetermined number and a relative display time for the blank element is at least a second amount if the number of words in the first sentence is greater than the first predetermined number, the second amount being greater than the first amount; and
adding the blank display element and the relative display time parameter for the blank element to the data set such that the blank display element is associated with the relative display time parameter for the blank element.

45. The method of claim 44 wherein the relative display time for the blank element is at least a third amount if the number of words in the first sentence is greater than a second predetermined number, the third amount being greater than the second amount and the second predetermined number being greater than the first predetermined number.

46. The method of claim 45 wherein the first predetermined number is twelve and the second predetermined number is twenty-two.

47. A computer implemented method of processing text data to obtain processed text usable for serial text presentation on an electronic display, each step of the method using one or more computers, the method comprising:
parsing the text data to identify at least words and sentences;
creating respective display elements for displaying respective words identified from the text data;
associating respective display data with the respective display elements, the respective display data being usable to display the respective display elements such that, for at least a plurality of display elements of the respective display elements, an optimal recognition position of each of the plurality of display elements is displayed at a substantially same location on the electronic display, referred to as a fixed display location; and
electronically communicating the respective display elements and the respective display data for serially displaying the respective display elements on the electronic display.

48. The method of claim 47 wherein the display data includes data identifying an optimal recognition character of the display element, the optimal recognition character to be displayed at the fixed display location.

49. The method of claim 48 wherein if a total number of characters in the display element is three, four, or five, then the optimal recognition position character is the second character in the display element.

50. The method of claim 49 wherein if the total number of characters in the display element is six, seven, eight, or nine, then the optimal recognition position character is the third character in the display element.

51. The method of claim 48 wherein if the total number of characters in the display element is ten, eleven, twelve, or thirteen, then the optimal recognition position character is the fourth character in the display element.

52. The method of claim 51 wherein if the total number of characters is fourteen, fifteen, sixteen, seventeen, eighteen, nineteen or twenty, then the optimal recognition position character is the fifth character in the display element.

53. The method of claim 48 wherein the optimal recognition character is displayed at the fixed display location prior to display of characters in the display element that are located to the left and right of the optimal recognition character.

54. The method of claim 47 wherein the optimal recognition position of a display element of the at least some display elements is located at a position, referred to as an optimal proportionate position, along a reading direction of the display element that is a distance in pixels from a beginning of the display element, the distance in pixels being a proportion of the display element's pixel width.

55. The method of claim 54 wherein the proportion of the display element's pixel width is a function of at least the display element's number of characters and an empirically determined recognition position ratio.

56. The method of claim 55 wherein the proportion of the display element's pixel width is equal to the empirically determined recognition position ratio added to a quotient of 0.5 divided by the number of characters in the display element.

57. The method of claim 53 wherein the empirically determined recognition ratio is an average position ratio of respective optimal recognition position characters for respective display elements from a length of three characters to a length of at least thirteen characters.

58. The method of claim 57 wherein the average position ratio is equal or substantially equal to 0.265.

59. The method of claim 58 wherein the distance in pixels from the beginning of the display element is greater than or equal to 0.20 and less than or equal to 0.45 of the display element's total width.

60. The method of claim 54 wherein the optimal proportionate position provides an offset amount for a pixel at the beginning of the display element, referred to as a beginning pixel, the method further comprising displaying the display element such that the beginning pixel of the display element is at a position that is the offset amount away from the fixed display location.

61. The method of claim 60 wherein the offset amount in pixels is equal to the empirically determined position ratio multiplied by a width of the display element in pixels plus one half of the average character width in pixels of characters in the display element, rounded to the nearest whole pixel number.

62. The method of claim 47 wherein creating respective display elements comprises, for a word greater than thirteen characters, dividing the word greater than thirteen characters into at least first and second display elements, the first display element including a first portion of the word and a hyphen, the second display element including a second portion of the word.

* * * * *